(12) United States Patent
Jeon et al.

(10) Patent No.: US 12,725,781 B2
(45) Date of Patent: Sep. 1, 2026

(54) APPARATUS FOR CONTINUOUS ELECTRIC DEHYDRATION OF POSITIVE ELECTRODE ACTIVE MATERIAL

(71) Applicant: KOREA WATER TECHNOLOGY INC., Busan (KR)

(72) Inventors: Se Jeong Jeon, Seoul (KR); Sung Ryong Kim, Busan (KR)

(73) Assignee: KOREA WATER TECHNOLOGY INC., Busan (KR)

( * ) Notice: Subject to any disclaimer, the term of this patent is extended or adjusted under 35 U.S.C. 154(b) by 528 days.

(21) Appl. No.: 18/231,294

(22) Filed: Aug. 8, 2023

(65) Prior Publication Data

US 2024/0072235 A1 Feb. 29, 2024

(30) Foreign Application Priority Data

Aug. 25, 2022 (KR) ........................ 10-2022-0106818

(51) Int. Cl.
*H01M 4/04* (2006.01)
*H01M 4/02* (2006.01)
*H01M 10/04* (2006.01)

(52) U.S. Cl.
CPC .... *H01M 4/0457* (2013.01); *H01M 2004/028* (2013.01); *H01M 10/0404* (2013.01)

(58) Field of Classification Search
CPC .. H01M 4/045; H01M 4/0452; H01M 4/0457; H01M 2004/027; H01M 2004/028; H01M 10/0404; H01M 10/0409; H01M 10/058; H01M 10/0583; H01M 10/0585; H01M 10/0587
See application file for complete search history.

(56) References Cited

U.S. PATENT DOCUMENTS 8,293,090 B2 * 10/2012 Lee ........................... F26B 5/00 204/639

FOREIGN PATENT DOCUMENTS

| | | | |
|---|---|---|---|
| EP | 20110076513 | * | 7/2011 |
| KR | 10-0457628 B1 | | 11/2004 |
| KR | 10-2015-0085985 A | | 7/2015 |
| KR | 10-1941869 B1 | | 1/2019 |
| KR | 10-2022-0025422 A | | 3/2022 |

* cited by examiner

*Primary Examiner* — Matthew W Van Oudenaren
(74) *Attorney, Agent, or Firm* — Revolution IP, PLLC

(57) ABSTRACT

An apparatus for continuous electric dehydration of a positive electrode active material, includes a first electrode; a transfer member on which a positive electrode active material is seated, moves to continuously transfer the positive electrode active material to the drum; and a guide device, which is disposed to surround a part or all of the drum and in which the positive electrode active material comes into close contact between the guide device and an outer circumferential surface of the drum when the transfer member moves between the guide device and the outer circumferential surface of the drum and which includes a second electrode for generating an electric field caused by a potential difference between the first electrode and the second electrode so that a cleaning solution remaining in the positive electrode active material introduced by the transfer member is dehydrated by using electrophoresis due to the electric field.

13 Claims, 8 Drawing Sheets

APPARATUS FOR CONTINUOUS ELECTRIC DEHYDRATION OF POSITIVE ELECTRODE ACTIVE MATERIAL

CROSS-REFERENCE TO RELATED APPLICATION

This application claims the benefit of Korean Patent Application No. 10-2022-0106818, filed on Aug. 25, 2022, in the Korean Intellectual Property Office, the disclosure of which is incorporated herein in its entirety by reference.

TECHNICAL FIELD

The present invention relates to an apparatus for continuous electric dehydration of a positive electrode active material, and more particularly, to an apparatus for continuous electric dehydration of a positive electrode active material in which an electric field is applied to the positive electrode active material disposed between a rotating drum and a guide device disposed around the drum so that continuous dehydration can be performed.

BACKGROUND ART

A positive electrode active material is a material that participates in positive electrode reaction in a secondary battery such as a battery for an electric vehicle, and is a key material that occupies more than 40% of the cost of the secondary battery. Among these secondary batteries, lithium secondary batteries having high energy density and voltage, long cycle life, and low self-discharge rate have been commercialized and widely used. In this regard, a lithium cobalt composite metal oxide is mainly used as a positive electrode active material of a lithium secondary battery. However, when such a lithium cobalt composite metal oxide is used as the positive electrode active material, it is insufficient to use the lithium cobalt composite metal oxide as a large-capacity power source. Thus, a lithium manganese composite metal oxide or the like is used to replace the lithium cobalt composite metal oxide. Among them, research and development on lithium nickel composite metal oxides having high reversible capacity are being actively conducted.

However, when such a lithium nickel composite metal oxide is used as a positive electrode active material, when the content of nickel is increased, the ionic radius of $Ni_2$+ is similar to that of Li+ so that cation mixing in which Ni is disposed in a Li layer, easily occurs. Due to this cation mixing, Li, which cannot enter the Li layer, reacts with oxygen and water in the air during a firing process to create $Li_2CO_3$ or LiOH material called residual lithium. These materials are thickly formed on the surface of a positive electrode and act as a resistance layer. When these materials are melted in a solvent during the process of manufacturing an electrode for cell production, not only the solvent is basified and is mixed with a binder to gelate a slurry so that an electrode cannot be manufactured, but also the solvent reacts with an electrolyte during operation to generate gas. Since the battery is easily inflated due to these gases and the risk of explosion is increased, removal of residual lithium is very important.

The easiest way to remove this residual lithium is by washing with water. Although residual lithium is easily removed with water, when water remaining on the surface of an active material is not quickly removed after the residual lithium is removed, Li in a structure will continuously come out. Thus, in order to quickly remove such residual moisture, mechanical dehydration, electrical dehydration, and a mixed method of mechanical dehydration and electrical dehydration according to the related art have been used. However, the shape of dehydration is discontinuous, and at each dehydration, a dehydrated positive active material needs to be removed, and a positive active material that needs dehydration needs to be introduced, so that a process cannot be quickly performed.

Disclosure of the Invention

The present invention provides an apparatus for continuous electric dehydration of a positive electrode active material in which an electric field is applied to the positive electrode active material disposed between a rotating drum and a guide device disposed around the drum so that continuous dehydration can be performed.

According to an aspect of the present invention, there is provided an apparatus for continuous electric dehydration of a positive electrode active material, the apparatus including: a rotating drum including a first electrode; a transfer member on which a positive electrode active material is seated, moves to continuously transfer the positive electrode active material to the drum; and a guide device, which is disposed to surround a part or all of the drum and in which the positive electrode active material comes into close contact between the guide device and an outer circumferential surface of the drum when the transfer member moves between the guide device and the outer circumferential surface of the drum and which includes a second electrode for generating an electric field caused by a potential difference between the first electrode and the second electrode so that a cleaning solution remaining in the positive electrode active material introduced by the transfer member is dehydrated by using electrophoresis due to the electric field.

Effects of the Invention

An apparatus for continuous electric dehydration of a positive electrode active material according to the present invention has the following effects.

First, a positive electrode active material is put between a rotating drum and a guide device so that the positive electrode active material can be continuously dehydrated.

Second, since the positive electrode active material is put in the 6 o'clock direction of the drum, moves along the outer circumferential surface of the drum and then is discharged in the 3 o'clock or 9 o'clock direction of the drum after passing through the 12 o'clock direction of the drum, a structure in which positioning of the positive electrode active material at a lower part of the drum is minimized and the positive electrode active material is mainly disposed at side surfaces or an upper portion of the drum so that the re-inflow of condensate water can be minimized and the dehydration effect can be improved.

Third, a filter having a structure through which a cleaning solution can pass and the positive electrode active material cannot pass, is disposed on the guide device so that the problem of leakage of the positive electrode active material during dehydration can be solved.

Fourth, the filter disposed on the guide device has conductivity so that the strength of an electric field is not reduced compared to the case where a non-conductive filter is used.

Fifth, since a spacer is disposed between the drum and the guide device, even when the positive electrode active material is not disposed between the drum and the guide device, a conductive filter disposed on the guide device is not in direct contact with the drum.

DETAILED DESCRIPTION FOR CARRYING OUT THE INVENTION

Hereinafter, the present invention will be described in detail with reference to the accompanying drawings, in which exemplary embodiments of the invention are shown.

Referring to FIGS. 1 through 7, an apparatus 1000 for continuous electric dehydration of a positive electrode active material according to an embodiment of the present invention includes a drum 1100, a guide device 1200, a transfer member 1300 on which a positive electrode active material (not shown) is seated and which continuously transfers the positive electrode active material (not shown) between the drum 1100 and the guide device 1200, a filter 1400, a spacer 1500, and a drum cooling device 1600. The apparatus 1000 for continuous electric dehydration of the positive electrode active material according to the present embodiment dehydrates a cleaning solution that remains in the positive electrode active material by using an electrophoresis method by applying an electric field to the positive electrode active material when the positive electrode active material that has undergone a cleaning process moves continuously. That is, a case where the apparatus 1000 for continuous electric dehydration of a positive electrode active material according to the present embodiment is a process after the positive electrode active material passes through a pressurized dehydration device or a centrifugation dehydration device in a state in which the cleaning solution remains in the positive electrode active material through a washing process and the cleaning solution is primarily removed (mechanically dehydrated), will be described. Thus, the primarily-dehydrated positive electrode active material moves to the apparatus 1000 for continuous electric dehydration of the positive electrode active material according to the present embodiment. However, the present invention is not limited thereto, and a positive electrode active material that is not primarily dehydrated may also be dehydrated. In the present embodiment, a case where the cleaning solution is water, will be described, and the type of the cleaning solution may be changed.

Figure 1:
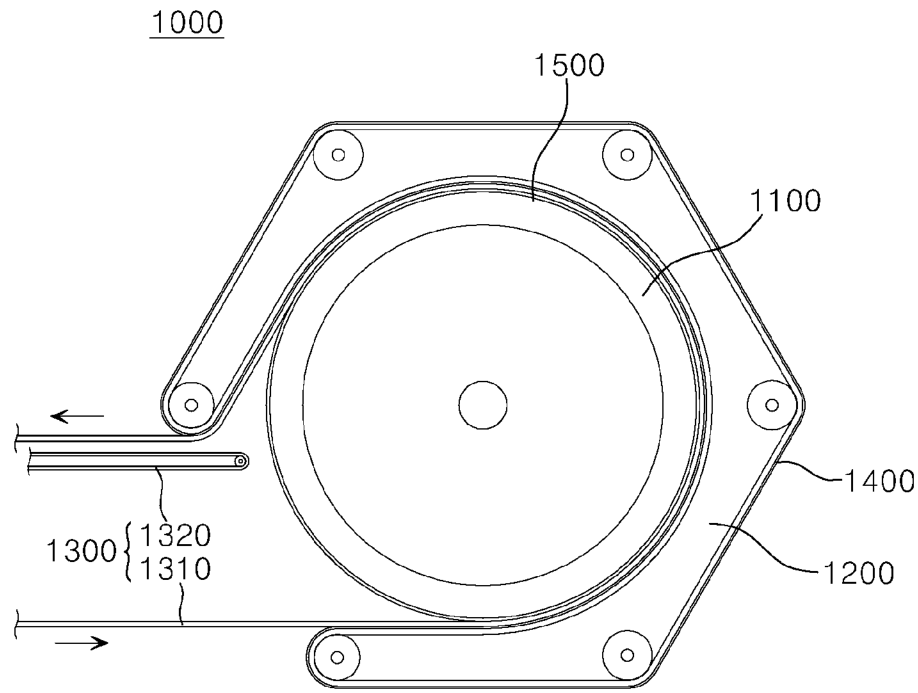
FIG. 1 is a diagram of an apparatus for continuous electric dehydration of a positive electrode active material according to an embodiment of the present invention.
Figure 2:
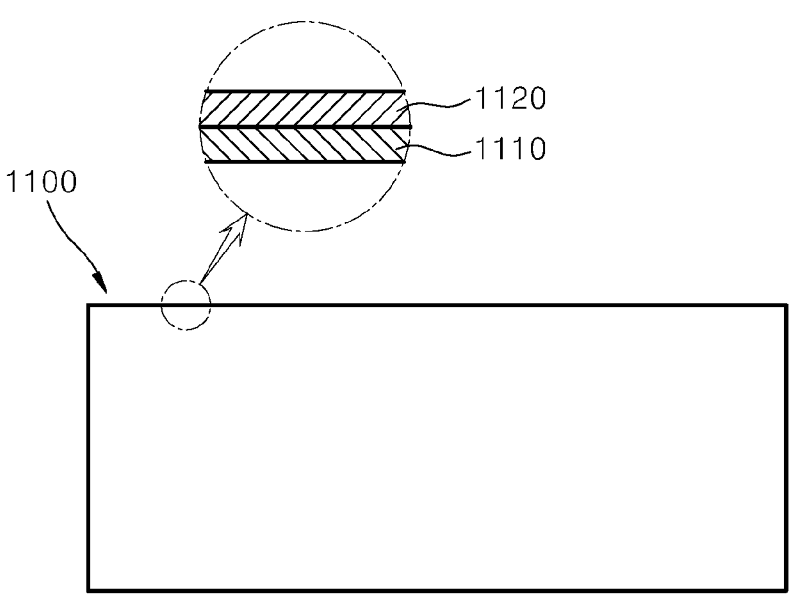
FIG. 2 is a diagram illustrating the structure of a drum of the apparatus for continuous electric dehydration of the positive electrode active material shown in FIG. 1.

The drum 1100 includes a drum body portion 1110 and a first electrode 1120. The drum body portion 1110 is formed in a cylindrical shape with a hollow inside. The drum 1100 rotates together with the guide device 1200 when the positive electrode active material is transferred along the transfer member 1300. In this case, the drum 1100 and the guide device 1200 rotate in opposite directions. The first electrode 1120 is formed on the surface of the drum body portion 1110 to cover the outer circumferential surface of the drum body portion 1110. In this case, a case where the first electrode 1120 has insolubility, will be described. A case where the first electrode 1120 is disposed to have a sheet structure on the outer circumferential surface of the drum body portion 1110, will be described. However, the present invention is not limited thereto, and the first electrode 1120 may also be formed by being coated on the outer circumferential surface of the drum body portion 1110. The first electrode 1120 is formed as a positive (+) electrode, and direct current (DC) power is applied to the first electrode 1120. Referring to FIG. 1, the drum 1100 has a drum shaft coupling hole to which a drum shaft is coupled and which is formed in the center of the drum 1100. For convenience of illustration, illustration of the drum shaft is omitted.

The drum 1100 may further include a scraper for removing the positive electrode active material. This is to remove the positive electrode active material when it is transferred between the drum 1100 and the guide device 1200, is attached to the drum 1100 or the spacer 1500 installed on the drum 1100 and does not come off.

Figure 3:
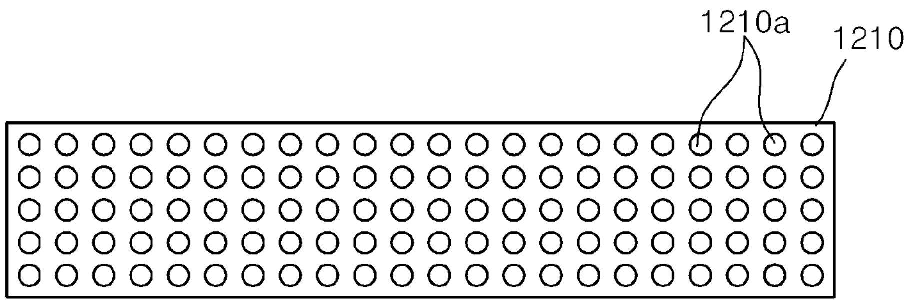
FIG. 3 is a diagram illustrating the structure of a guide device of the apparatus for continuous electric dehydration of the positive electrode active material shown in FIG. 1.

The guide device 1200 provides a path on which the positive electrode active material moves. The guide device 1200 is disposed to surround the drum 1100 along the outer circumferential surface of the drum 1100. The guide device 1200 has a structure which surrounds part or all of the drum 1100 and in which pressure is increased by compressing the drum 1100 in proportion to tension when tension is given to the guide device 1200. Specifically, the guide device 1200 includes a guide device body portion 1210 and a second electrode (not shown). The guide device body portion 1210 includes a belt member and a roller member. FIG. 3 illustrates a state in which the belt member is unfolded. In the present embodiment, it will be described that the guide device body portion 1210 and the second electrode are separate components, but the guide device body portion 1210 itself may also be formed as a structure serving as the second electrode. That is, the belt member that rotates by the roller member may also be configured as the second electrode. The guide device body portion 1210 is disposed to surround the outer circumferential surface of the drum 1100. The guide device body portion 1210 is disposed to surround part or all of the drum 1100 and to compress the surface of the drum 1100 when tension is given to the guide device body portion 1210.

In the present embodiment, a case where the guide device body portion 1210 is formed in a perforated structure through which the cleaning solution can pass, will be described. In the present embodiment, a case where the guide device body portion 1210 has a caterpillar or mesh structure, will be described. That is, since the cleaning solution is water, the guide device body portion 1210 is formed in a perforated structure through which water and water vapor can pass, will be described. As referred to FIG. 3, a plurality of guide device holes 1210*a* are formed in the guide device body portion 1210 to be spaced apart from each other. In the present embodiment, a case where the positive electrode active material cannot pass through the plurality of guide device holes 1210*a*, will be described. However, since the positive electrode active material is not discharged by the filter 1400 to the guide device body portion 1210, there is no problem as long as only the cleaning solution can pass through the guide device holes 1210*a* regardless of whether the positive electrode active material passes through.

The guide device body portion 1210 provides a path so that the positive electrode active material is introduced in the 6 o'clock direction of the drum 1100. Specifically, the guide device body portion 1210 provides a path so that the positive electrode active material is introduced in a direction (a horizontal direction) crossing the 6 o'clock direction of the drum 1100. The guide device body portion 1210 moves along the outer circumferential surface (specifically, the first electrode 1120) of the drum 1100 and is disposed to surround a part of the outer circumferential surface of the drum 1100 so that the positive electrode active material can be discharged in the 3 o'clock direction or the 9 o'clock direction of the drum 1100 after passing through the 12 o'clock direction of the drum 1100. In the present embodiment, a case where the guide device body portion 1210 extends in the 6 o'clock direction of the drum 1100 from the right side of the drum 1100, will be described. Thus, the guide device body portion 1210 passes through the 9 o'clock direction and the 12 o'clock direction of the drum 1100 sequentially, so that the positive electrode active material is discharged in the 3 o'clock direction of the drum 1100. This is to improve the discharge efficiency of the residual cleaning solution between the drum 1100 and the guide device 1200 by minimizing the positive electrode active material being disposed on the lower portion of the drum 1100 by disposing the positive electrode active material on the upper portion or side surfaces of the drum 1100. That is, when electric dehydration is performed, heat is generated, and water in the positive electrode active material is often evaporated, and when the drum 1100 is disposed on the upper portion of the positive electrode active material, evaporated water vapor ascends, meets with the cold drum 1100 and is condensed again so that the moisture content of the positive electrode active material may increase. Thus, when the drum 1100 is disposed on the side portion or the lower portion of the positive electrode active material, water vapor evaporated from the positive electrode active material is not in contact with the drum 1100 and can be discharged through the filter 1400, the second electrode, and the guide device 1200, and there is an advantage that the amount of condensed water vapor can be remarkably reduced.

The second electrode generates an electric field with the positive electrode active material between the second electrode and the first electrode 1120 included in the drum 1100 and is formed as a negative (−) electrode having a potential difference with the first electrode 1120 so as to dehydrate the cleaning solution that remains in the positive electrode active material by using an electrophoresis method. DC power is applied to the second electrode. However, the present invention is not limited thereto, and the second electrode may be configured as a ground electrode.

The second electrode is disposed on the guide device body portion 1210. In the present embodiment, a case where the second electrode has a mesh structure through which the cleaning solution can pass and the positive electrode active material cannot pass, will be described. Specifically, the second electrode is formed in a sheet structure in which a plurality of holes are formed, as in the guide device body portion 1210. In the present embodiment, a case where the second electrode is disposed to come into close contact with the guide device body portion 1210 and is coupled to the guide device body portion 1210, will be described. However, the present invention is not limited thereto, and the second electrode may be formed to be coated on the guide device body portion 1210. Since the positive electrode active material is not discharged by the filter 1400 to the second electrode, as long as the second electrode has a structure through which only the cleaning solution can pass, regardless of whether the positive electrode active material passes through, the second electrode is not structurally limited.

The positive electrode active material moves between the drum 1110 and the guide device 1120. Specifically, the positive electrode active material is disposed adjacent to the drum 1100, continuously moves along the guide device 1200 disposed to surround a part of the outer circumferential surface of the drum 1100 by using the transfer member 1300, and rotates together with the drum 1100 while being pressurized toward the surface of the drum 1100 due to tension of the guide device body portion 1210. In the present embodiment, a case where the positive electrode active material is a lithium composite transition metal oxide, will be described. The lithium composite transition metal oxide may be manufactured by mixing a transition metal precursor and a lithium raw material with each other and then firing a mixture. The transition metal precursor may be a hydroxide including nickel (Ni), cobalt (Co), and manganese (Mn), oxyhydroxide, carbonate, or organic complex. Specifically, the transition metal precursor may be nickel-cobalt hydroxide, nickel-cobalt oxyhydroxide, nickel-cobalt-manganese hydroxide, nickel-cobalt-manganese oxyhydroxide, or hydroxide or oxyhydroxide doped with metal but is not limited thereto. However, the present invention is not limited thereto, and the type and the manufacturing method of the positive electrode active material may be changed.

As described above, positive electrode power is applied to the drum 1100 and negative electrode power is applied to the guide device 1200 to have a potential difference therebetween. The drum 1100 and the guide device 1200 are disposed to come into close contact with each other in order to dehydrate the cleaning solution remaining in the positive electrode active material through electrophoresis by applying an electric field with the positive electrode active material therebetween. When power is applied to the drum 1100 and the guide device 1200, water included in the positive electrode active material flows toward the guide device 1200. This is because positive ions distributed in water move toward the negative electrode by an electric force, dragging water molecules along with the positive ions. At this time, lithium ions remaining on the surface of the positive electrode active material have an additional effect of moving toward the guide device 1200. In addition, water molecules moving by heat are converted into water vapor.

The transfer member 1300 on which the positive electrode active material is seated, moves and transfers the positive electrode active material to the drum 1100 continuously. In the present embodiment, the transfer member 1300 includes an injection transfer member 1310 and a discharge transfer member 1320. In the present embodiment, a case where the transfer member 1300 is injected in the 6 o'clock direction of the drum 1100, extends along the circumference of the drum 1100, is discharged in the 9 o'clock direction of the drum 1100 and extends, will be described. In this case, the injection transfer member 1310 transfers the positive electrode active material between the drum 1100 and the guide device 1200. In the drawings, it is illustrated that the injection transfer member 1310 is injected in the 6 o'clock direction of the drum 1100, is disposed to surround the outer circumferential surface of the drum 1100 and is discharged in the 9 o'clock direction of the drum 1100, but the injection transfer member 1310 may extend only in the 6 o'clock direction of the drum 1100 so that the positive electrode active material can be injected between the drum 1100 and the guide device 1200. The discharge transfer member 1320 is disposed at the lower side of a portion to which the positive electrode active material is discharged so that the positive electrode active material can be discharged and transferred in the 9 o'clock direction (a direction in which the positive electrode active material is discharged) of the drum 1100. The discharge transfer member 1320 is flatly installed in a horizontal direction so that the positive electrode active material can be seated and transferred when the positive electrode active material is discharged in the 9 o'clock direction of the drum 1100.

The filter 1400 is disposed to be separable between the guide device 1200 and the positive electrode active material. Specifically, the filter 1400 is disposed to come into close contact with the guide device 1200. In this case, a fixing member for fixing the filter 1400 onto the guide device 1200 may be further included. The filter 1400 is separated from the fixing member and is detachable from the guide device 1200 so as to be replaceable. When dehydration is repeatedly performed for a long time, a problem that the positive electrode active material is stuck in a pore of the filter 1400 and the filter 1400 is clogged, may occur. In the present invention, since the filter 1400 can be replaced, this problem can be conveniently solved, and the performance of the apparatus 1000 for continuous electric dehydration of a positive electrode active material can be continuously maintained.

The filter 1400 has a structure through which the positive electrode active material cannot pass and the remaining cleaning solution of the positive electrode active material attracted by the electrophoresis method can pass. That is, a case where the filter 1400 has a mesh structure with a plurality of holes through which the positive electrode active material cannot pass and the cleaning solution can pass, will be described. Thus, the problem of leakage of the positive electrode active material during dehydration can be solved. However, the present invention is not limited thereto, and the structure of the filter 1400 may be changed into another structure through which the positive electrode active material cannot pass and the cleaning solution can pass.

The filter 1400 is formed of a conductive material so as to prevent decrease in the strength of the electric field applied by the filter 1400 to the positive electrode active material. The amount of the remaining cleaning solution of a general positive electrode active material is not large. Thus, when a filter is manufactured by using a general filter cloth, it is highly likely that the filter cloth will be in a dry state rather than maintaining a wet state. In this case, since the filter cloth needs to perform an insulating function, it becomes similar to the structure in which an insulator is inserted between electrodes, so that the strength of the electric field between the electrodes (i.e., the force that attracts the remaining cleaning solution to the electrodes) is reduced and thus, there is a very high possibility that dehydration performance may be deteriorated. Thus, in the present embodiment, the filter 1400 is disposed on the guide device 1200 and is formed of a conductive material so that dehydration performance can be continuously maintained.

In the present embodiment, a case where the filter 1400 is formed of a steel use stainless (SUS) material to improve conductivity and corrosion resistance, will be described. However, the material of the filter 1400 may be changed into another material having conductivity. That is, SUS is a conductive material but has low electrical conductivity. However, since there is an advantage of excellent performance of corrosion resistance, SUS is not corroded by the cleaning solution or the like but can be continuously used. Metal materials may be used as conductive materials, and materials having conductivity in which non-conductive materials and conductive materials are mixed with each other, may also be used. That is, in the present invention, the filter 1400 means excluding only non-conductive materials as well as material having very high electrical conductivity.

The spacer 1500 is disposed on the drum 1100 or the filter 1400 so as to maintain a distance between the drum 1100 and the filter 1400 to prevent the drum 1100 and the filter 1400 from directly contacting each other. In the present embodiment, a case where the spacer 1500 is fixed to the drum 1100 to come into close contact with the outer circumferential surface of the drum 1100, will be described. However, the present invention is not limited thereto, and the spacer 1500 may also be formed in a structure in which the spacer 1500 is fixed to the filter 1400 to be in close contract with the filter 1400 disposed on the guide device 1200. The spacer 1500 may have a lattice shape or a shape including several wires with a constant distance and is formed of an electrical insulating material. In the present embodiment, a case where the material of the spacer 1500 is a glass fiber material, will be described.

Figure 4:
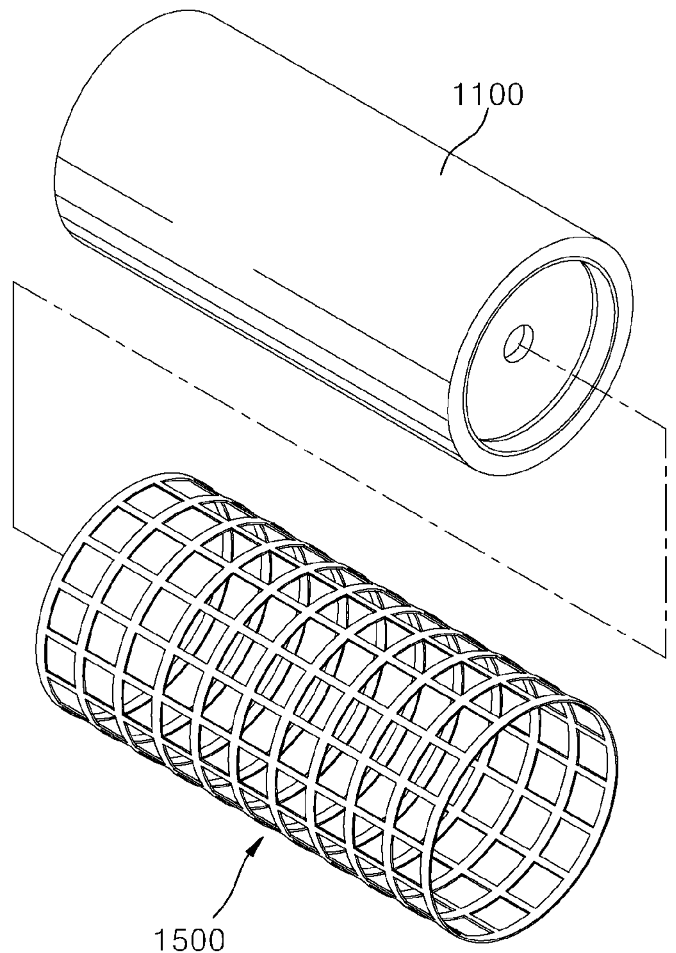
FIG. 4 is a diagram illustrating a coupling structure of the drum and a spacer of the apparatus for continuous electric dehydration of the positive electrode active material shown in FIG. 1.
Figure 5:
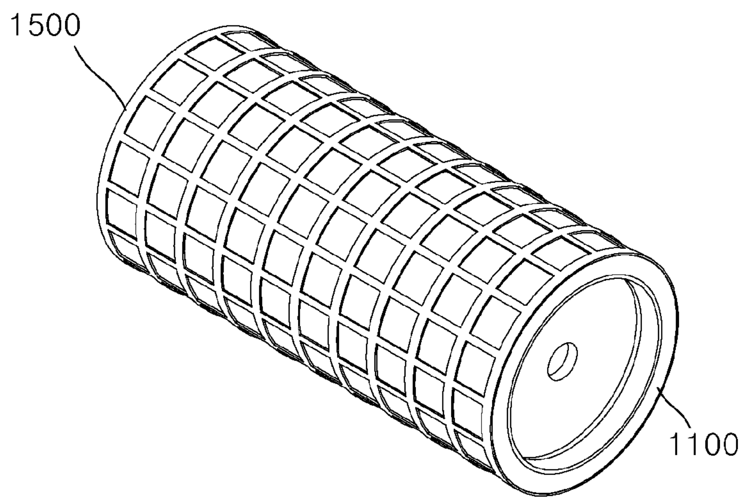
FIG. 5 is a diagram illustrating a coupling state of the drum and the spacer of the apparatus for continuous electric dehydration of the positive electrode active material shown in FIG. 1.
Figure 6:
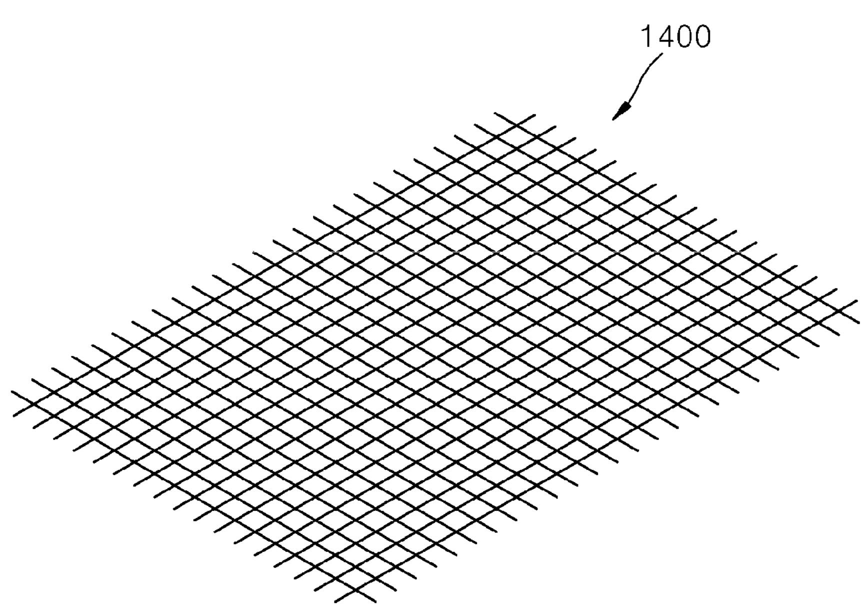
FIG. 6 is an enlarged diagram illustrating a filter of the apparatus for continuous electric dehydration of the positive electrode active material shown in FIG. 1.

In the present embodiment, the spacer 1500 is formed in a structure in which it may be inserted into the outer circumferential surface of the drum 1100, as referring to FIG. 4. That is, the spacer 1500 has a detachable structure from the drum 1100. Specifically, the spacer 1500 has a cylindrical shape with a hollow inside and is formed in a mesh-shaped or lattice-shaped structure in which a top surface and a bottom surface of the spacer 1500 are opened and a plurality of holes are formed along side surfaces of the spacer 1500. In the present embodiment, a case where the spacer 1500 is integral, will be described. However, the present invention is not limited thereto, and the spacer 1500 may also be formed in a separable structure into two parts along a longitudinal direction. At this time, the spacer 1500 may combine the two separated parts through fitting. In this case, a fitting protrusion may be formed in a first part of the two separated parts, and a fitting protrusion coupling groove into which the fitting protrusion can be inserted may be formed in a second part, which is another part. However, the present invention is not limited thereto, and the spacer 1500 may also be formed in a structure that can be coupled by using other coupling means. When the spacer 1500 is formed in such a separable structure, the spacer 1500 can be easily coupled to or separated from the drum 1100.

In the present embodiment, a case where the side surfaces of the spacer 1500 have a structure in which a plurality of holes are formed in a lattice shape, will be described, but the spacer 1500 is disposed to extend in the longitudinal direction of the drum 1100 on the side surfaces of the drum 1100 and may be spaced apart from each other so that a plurality of linear members of which distance is maintained in the circumferential direction of the side surfaces of the drum 1100. In addition, the spacer 1500 may be disposed to extend in the circumferential direction on the side surfaces of the drum 1100, and a plurality of linear members of which distance is maintained in the circumferential direction of the side surfaces of the drum 1100, may be spaced apart from each other.

In the present embodiment, when the positive electrode active material is transferred by the transfer member 1300 between the drum 1100 and the guide device 1200, the spacer 1500 arranged on the outer circumferential surface of the drum 1100 and the filter 1400 arranged on the outer circumferential surface of the guide device 1200 are not spaced apart from each other but come into close contact with each other. Specifically, the positive electrode active material enters between the drum 1100 and the guide device 1200, and one side of the positive electrode active material comes into close contact with the drum 1100 or the spacer 1500, and the other side of the positive electrode active material comes into close contact with the filter 1400. That is, as the positive electrode active material enters between the drum 1100 and the guide device 1200, pressure is generated by the tension of the spacer 1500 or the filter 1400 formed in a mesh structure when the positive electrode active material enters between the drum 1100 and the guide device 1200, so that the positive electrode active material comes into close contact between the drum 1100 or the spacer 1500 and the filter 1400 and is inserted therein.

In the present embodiment, when the spacer 1500 is installed on the guide device 1200, a sweeping roll may be installed in the guide device 1200. The sweeping roll is installed to remove the positive electrode active material that is attached to the spacer 1500 and does not come off. In the present embodiment, the sweeping roll is installed at an end of the guide device 120 in the 9 o'clock direction of the drum 1100 in which the positive electrode active material is discharged. Specifically, the sweeping roll is disposed so as to be spaced apart from the roller member installed in the 9 o'clock direction of the guide device 1200. At this time, the spacer 1500 extends from the roller member installed in the 9 o'clock direction of the guide device 1200 to the sweeping roll to form an endless track including the sweeping roll. The sweeping roll has a convex surface to remove the positive electrode active material that is attached to the spacer 1500 and does not come off. A collection belt for collecting the positive electrode active material separated from the spacer 1500 by the sweeping roll is further disposed below the sweeping roll. The collection belt is installed so as not to interfere with the transfer member 1300.

Figure 7:
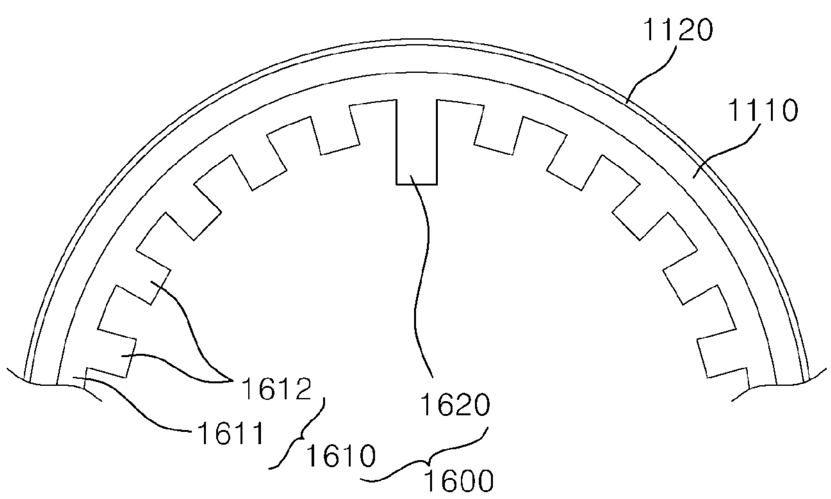
FIG. 7 is a diagram illustrating a water cooled cooling device installed at the drum of the apparatus for continuous electric dehydration of the positive electrode active material shown in FIG. 1.

Referring to FIG. 7, the drum cooling device 1600 is installed to prevent the drum 1100 from overheating. FIG. 7 is a cross-sectional view of the drum 1100 viewed from a direction parallel to the direction in which the drum shaft is disposed. The drum cooling device 1600 includes a cooling water flow pipe 1610, a cooling water inlet 1620, a cooling water outlet (not shown), and a blowing fan (not shown). The cooling water flow pipe 1610 is disposed to come into close contact with the inner circumferential surface of the drum body portion 1110. The drum body portion 1110 includes a cooling water flow pipe body portion 1611 and a cooling water flow pipe protrusion 1612.

The cooling water flow pipe body portion 1611 that is a portion for providing a space in which cooling water introduced into the cooling water inlet 1620 may flow, has a structure in which a hollow through which a fluid may flow, is formed. The cooling water flow pipe body portion 1611 is disposed to come into close contact with the inner circumferential surface of the drum body portion 1110. The cooling water flow pipe protrusion 1612 is a portion that extends from the cooling water flow pipe body portion 1611 and protrudes toward an inner center of the drum 1100 and protrudes. The cooling water flow pipe protrusion 1612 communicates with the cooling water flow pipe body portion 1611. A space in which the cooling water may be filled, is formed inside the cooling water flow pipe protrusion 1612. A plurality of cooling water flow pipe protrusions 1612 are formed along the inner circumferential surface of the drum body portion 1110 to be spaced apart from each other. The cooling water flow pipe protrusions 1612 are formed to improve cooling efficiency when air is supplied from the blowing fan by increasing the surface area of the cooling water flow pipe 1610. In the present embodiment, a case where the cooling water flow pipe protrusions 1612 protrude toward the inner center of the drum body portion 1110, will be described, but a path on which the cooling water flow pipe protrusions 1612 communicate with each other, may also be additionally formed.

The cooling water inlet 1620 is formed at one edge of the drum body portion 1110 in an axial direction. For example, the cooling water inlet 1620 is formed parallel to the axial direction, but the cooling water inlet 1620 may be formed in a direction from the center of the drum body portion 1110 toward a rim. Although the cooling water outlet is formed at the other edge of the drum body portion 1110 in the axial direction, the formation position of the cooling water outlet may be changed.

The blowing fan is installed to supply cold air to the inside of the drum body portion 1110. A case where the blowing fan is installed inside the drum body portion 1110, will be described, and the blowing fan may also be installed outside the drum body portion 1110. Although not shown in the drawings, the drum body portion 1110 may include a plurality of air flow holes through which air may flow and which are formed at one side and the other side of the drum body portion 1110 in the axial direction. Hot air that is heat-exchanged by the drum cooling device 1600 may be discharged to the outside of the drum body portion 1110 through the air flow hole.

Although not shown in the drawings, a temperature sensor for detecting the temperature of the drum body portion 1110 may be installed inside the drum body portion 1110. A light-emitting diode (LED) light source that emits light when the drum body portion 1110 rotates, may be installed at the outer circumferential surface of one side edge and the other edge of the drum shaft. The LED light source may emit light of a first color when the temperature of the drum 1110 does not exceed a set temperature, and the LED light source may emit light of a second color that is different from the first color when the temperature of the drum 1110 exceeds the set temperature. The LED light source is connected to the temperature sensor, and the color of the LED light source may be changed according to a temperature change of the drum body portion 1110.

A controller disposed in the drum body portion 1110 may control the supply of the cooling water through the cooling water inlet 1620 and the operation of the blowing fan automatically. The controller controls the supply of the cooling water and the operation of the blowing fan so as to maintain temperature set by a manager. In this case, when the temperature of the drum body portion 1110 is not controlled through control of the controller and the color of the LED light source is changed into the second color, the manager may check that the temperature of the drum body portion 1110 exceeds the set temperature visually through a color change of the LED light source and may change temperature control settings of the controller.

Although not shown in the drawings, a guide device cooling device for preventing the guide device 1200 from overheating is installed at the guide device 1200. The cooling device installed in the guide device 1200 may be an air cooled cooling device for preventing the guide device 1200 from overheating. However, the present invention is not limited thereto, and a cooling device having a similar structure to the drum cooling device 1600 may also be formed to prevent the guide device 1200 from overheating. In this case, the cooling device may be formed at the inner circumferential surface of each of rotating rollers that constitute the guide device body portion 1210.

Figure 8:
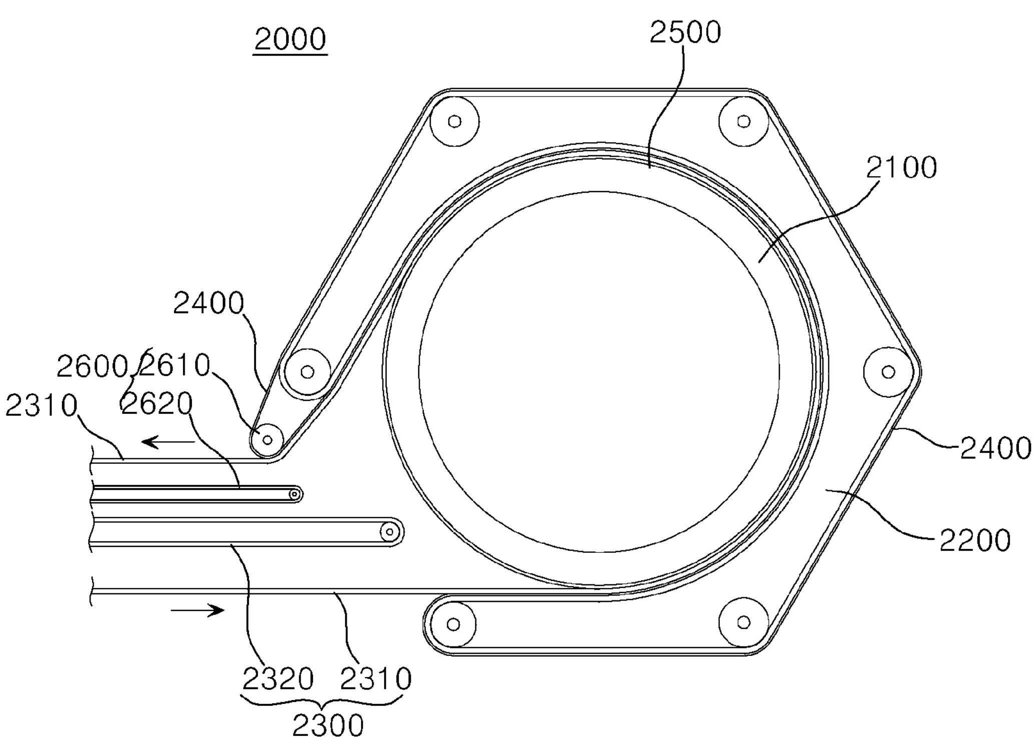
FIG. 8 is a diagram illustrating an apparatus for continuous electric dehydration of a positive electrode active material according to another embodiment of the present invention.

Referring to FIG. 8, an apparatus 2000 for continuous electric dehydration of a positive electrode active material according to another embodiment of the present invention includes a drum 2100, a guide device 2200, a transfer member 2300 on which a positive electrode active material (not shown) is seated and which continuously transfers the positive electrode active material (not shown) between the drum 2100 and the guide device 2200, a filter 2400, a spacer 2500, a drum cooling device (not shown), and a positive electrode active material sweeping device 2600. The apparatus 2000 for continuous electric dehydration of a positive electrode active material according to the present embodiment is different from the apparatus 1000 for continuous electric dehydration of a positive electrode active material shown in FIGS. 1 through 7 in that the positive electrode active material sweeping device 2600 is further included, and the other configuration is similar to that of the apparatus 1000 for continuous electric dehydration of a positive electrode active material shown in FIGS. 1 through 7. Thus, the description is centered on the positive electrode active material sweeping device 2600, and detailed descriptions of other configurations are omitted.

The positive electrode active material sweeping device 2600 is installed to be connected to the guide device 2200. The positive electrode active material sweeping device 2600 includes a sweeping roll 2610 and a collection belt 2620. The sweeping roll 2610 is installed to remove a positive electrode active material that is attached to the filter 2400 and does not come off. In the present embodiment, the sweeping roll 2610 is installed at an end of the guide device 2200 in the 9 o'clock direction of the guide device 2200 in which the positive electrode active material is discharged. Specifically, the sweeping roll 2610 is disposed adjacent to a roller member installed in the 9 o'clock direction of the guide device 2200 to be spaced apart from the roller member. At this time, the filter 2400 extends from the roller member installed in the 9 o'clock direction of the guide device 2200 to the sweeping roll 2610 to form an endless track including the sweeping roll 2610. The sweeping roll 2610 has a convex surface to remove the positive electrode active material that is attached to the filter 2400 and does not come off. That is, the positive electrode active material attached to the filter 2400 comes into contact with the convex surface of the sweeping roll 2610 and comes off due to friction or impact.

A collection belt 2620 for collecting the positive electrode active material separated from the filter 2400 by the sweeping roll 2610 is further disposed below the sweeping roll 2610. The collection belt 2620 is installed so as not to interfere with the transfer member 2300. In the present embodiment, a case where the sweeping roll 2610 removes the positive electrode active material attached to the filter 2400, will be described, but the present invention is not limited thereto, and the spacer 2500 may be installed at the guide device 2200 (not the drum 2100), and in this case, the sweeping roll 2610 may remove the positive electrode active material that is attached to the spacer 2500 and does not come off.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

By using the present invention, an apparatus for continuous electric dehydration of a positive electrode active material in which the positive electrode active material is put between a rotating drum and a guide device and the positive electrode active material can be continuously dehydrated, can be provided.

The invention claimed is:

1. An apparatus for continuous electric dehydration of a positive electrode active material, the apparatus comprising:

a rotating drum comprising a first electrode;

a transfer member on which a positive electrode active material is seated, configured to move to continuously transfer the positive electrode active material to the drum; and a guide device, which is disposed to surround a part or all of the drum and in which the positive electrode active material comes into contact between the guide device and an outer circumferential surface of the drum when the transfer member moves between the guide device and the outer circumferential surface of the drum and which comprises a second electrode for generating an electric field caused by a potential difference between the first electrode and the second electrode so that a cleaning solution remaining in the positive electrode active material is dehydrated by using electrophoresis due to the electric field.

2. The apparatus of claim 1, wherein the guide device is disposed to surround a part of the outer circumferential surface of the drum so that, after the positive electrode active material is put in a 6 o'clock direction of the drum, the positive electrode active material moves between the guide device and the outer circumferential surface of the drum, passes through a 12 o'clock direction of the drum and then is discharged in a 3 o'clock direction or a 9 o'clock direction of the drum.

3. The apparatus of claim 1, wherein the first electrode is a positive (+) electrode to which direct current (DC) power is supplied, and the second electrode is a negative (−) electrode to which the DC power is applied.

4. The apparatus of claim 1, wherein the drum comprises:

a drum body portion having a cylindrical shape; and the first electrode covering an outer circumferential surface of the drum body portion and having insolubility in the cleaning solution.

5. The apparatus of claim 1, wherein the guide device is formed as a perforated structure through which water and water vapor are capable of passing.

6. The apparatus of claim 1, further comprising a filter, which is disposed between the drum and the guide device and disposed on the guide device to come into contact with the guide device and through which the positive electrode active material cannot pass and the cleaning solution discharged from the positive electrode active material through electrophoresis can pass.

7. The apparatus of claim 6, wherein the filter is formed of a conductive material so as to prevent a strength of the electric field applied to the positive electrode active material from being reduced.

8. The apparatus of claim 6, wherein the filter is detachable from the guide device so as to be replaceable.

9. The apparatus of claim 6, further comprising a spacer disposed at the drum or the filter so as to maintain a distance between the drum and the guide device to prevent the drum and the filter from directly contacting each other.

10. The apparatus of claim 9, wherein the spacer has a mesh-shaped structure, a structure in which linear members extend in a longitudinal direction of the drum and a plurality of linear members are disposed to be spaced apart from each other in a circumference direction of the drum, or a structure in which the linear members extend in the circumference direction of the drum and the plurality of linear members are spaced apart from each other in the longitudinal direction of the drum, and has electrical insulation.

11. The apparatus of claim 1, further comprising a drum cooling device disposed on an inner circumferential surface of the drum to prevent the drum from overheating.

12. The apparatus of claim 1, further comprising a guide device cooling device disposed in the guide device to prevent the guide device from overheating.

13. The apparatus of claim 9, further comprising a positive electrode active material sweeping device, which is disposed at a portion of the guide device adjacent to an end in a direction in which the positive electrode active material is discharged and which, when the spacer is disposed on the drum, removes the positive electrode active material that is attached to the filter while contacting the filter and does not come off and when the spacer is disposed on the filter, removes the positive electrode active material that is attached to the spacer and does not come off while contacting the spacer.

* * * * *